US012801778B2

(12) United States Patent
Yin et al.

(10) Patent No.: US 12,801,778 B2
(45) Date of Patent: Nov. 17, 2026

(54) POST VISIBILITY PERMISSION SETTING METHOD, ELECTRONIC DEVICE, AND STORAGE MEDIUM

(71) Applicant: Beijing Zitiao Network Technology Co., Ltd., Beijing (CN)

(72) Inventors: Yan Yin, Beijing (CN); Zhimiao He, Beijing (CN); Yiwei Fang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/875,368

(22) PCT Filed: Dec. 20, 2023

(86) PCT No.: PCT/CN2023/140241
§ 371 (c)(1),
(2) Date: Dec. 16, 2024

(87) PCT Pub. No.: WO2024/146380
PCT Pub. Date: Jul. 11, 2024

(65) Prior Publication Data

US 2026/0003998 A1 Jan. 1, 2026

(30) Foreign Application Priority Data

Jan. 3, 2023 (CN) ........................ 202310004761.3

(51) Int. Cl.
*H04L 29/06* (2006.01)
*G06F 21/10* (2013.01)
(Continued)

(52) U.S. Cl.
CPC .......... *G06F 21/6245* (2013.01); *G06F 21/10* (2013.01); *G06F 21/604* (2013.01)

(58) Field of Classification Search
CPC .... G06F 21/6245; G06F 21/10; G06F 21/604; H04L 63/10; H04L 63/20; H04L 63/0263
See application file for complete search history.

(56) References Cited

U.S. PATENT DOCUMENTS

| | | | |
|---|---|---|---|
| 2008/0104679 | A1 | 5/2008 | Craig |
| 2019/0081975 | A1 | 3/2019 | Iaroshevych |

FOREIGN PATENT DOCUMENTS

| | | | |
|---|---|---|---|
| AU | 2012211130 | B2 | 11/2015 |
| CN | 106302666 | A | 1/2017 |

(Continued)

OTHER PUBLICATIONS

China National Intellectual Property Administration, Office Action and Search Report Issued in Application No. 202310004761.3, Jul. 17, 2025, 18 pages.

(Continued)

*Primary Examiner* — Longbit Chai
(74) *Attorney, Agent, or Firm* — Alleman Hall LLP

(57) ABSTRACT

Embodiments of the present disclosure provide a post visibility permission setting method, an electronic device, and a storage medium. The method includes: receiving a target trigger operation; and in response to the target trigger operation, configuring a target post to have a target visibility permission in a current application, when the target post has the target visibility permission, the target post being visible to second users in a posted state; the first account type of a target account is different from the default second account type of the current application, the first account type being set by a first user, the second users including at least some of users in the current application, and the at least some of users doing not execute a trigger operation of establishing a preset association relationship with the first user.

20 Claims, 5 Drawing Sheets

(51) Int. Cl.
*G06F 21/60* (2013.01)
*G06F 21/62* (2013.01)

(56) References Cited

FOREIGN PATENT DOCUMENTS

| | | | | | |
|---|---|---|---|---|---|
| CN | 106484501 | A | | 3/2017 | |
| CN | 110083771 | A | | 8/2019 | |
| CN | 106302666 | B | * | 9/2019 | ............ H04L 63/10 |
| CN | 112069524 | A | | 12/2020 | |
| CN | 115237290 | A | | 10/2022 | |
| CN | 116432148 | A | | 7/2023 | |
| JP | 2012164326 | A | | 8/2012 | |
| JP | 2013161103 | A | | 8/2013 | |

OTHER PUBLICATIONS

Shengzi Digital, "How to set up a private account to broadcast articles on Douyin," Baidu, Available Online at https://jingyan.baidu.com/article/597a06432a8a3f702a524352.html, Jun. 28, 2022, 4 pages.

European Patent Office, Extended European Search Report Issued in Application No. 23914513.9, Apr. 9, 2026, Germany, 8 pages.

Japan Patent Office, Office Action Issued in Application No. 2024573767, Jan. 27, 2026, 8 pages.

Kataoka, I., "Link-up, Easy-to-use mini LINE&Twitter&Facebook Basic & Convenient Techniques that can be used immediately", Oct. 20, 2014, 22 pages.

Suzuki, T.,"Google+ Hacks!", Dec. 31, 2011, 14 pages.

ISA China National Intellectual Property Administration, International Search Report and Written Opinion Issued in Application No. PCT/CN2023/140241, Mar. 16, 2024, WIPO, 10 pages. Submitted with translation of Search Report.

China National Intellectual Property Administration, Office Action and Search Report Issued in Application No. 202310004761.3, Apr. 25, 2026, 43 pages.

Youpizicai, "Usage guide: How to use the hopeAPP to bury a time capsule," Baidu Tieba, Available Online at https://tieba.baidu.com/p/6675633801, May 12, 2020, 20 pages.

* cited by examiner

POST VISIBILITY PERMISSION SETTING METHOD, ELECTRONIC DEVICE, AND STORAGE MEDIUM

CROSS-REFERENCE TO RELATED APPLICATIONS

The present application is a national phase application of International Patent Application No. PCT/CN2023/140241, filed on Dec. 20, 2023, which claims priority to and benefits of the Chinese patent application No. 202310004761.3, which was filed on Jan. 3, 2023. All the aforementioned patent applications are hereby incorporated by reference in their entireties.

TECHNICAL FIELD

Embodiments of the present application relate to a post visibility permission setting method and apparatus, an electronic device, and a storage medium.

BACKGROUND

Currently, users can set their own accounts as private accounts in some applications. Upon successful setting of such private accounts, posts posted by users in these private accounts will only be visible to their followers.

In some cases, however, the range of visibility that users can set for the posts in their private accounts is relatively limited, making it impossible to meet users' personalized needs.

SUMMARY

Embodiments of the present application provide a post visibility permission setting method and apparatus, an electronic device, and a storage medium.

In a first aspect, embodiments of the present disclosure provide a post visibility permission setting method, comprising:

receiving a target triggering operation from a first user; and setting, in response to the target triggering operation, a target post to have a target visibility permission in a current application;

wherein the target post is a post corresponding to the target triggering operation in a target account, and the target post, when having the target visibility permission, is visible to second users in a posted state; the target account is an account logged in by the first user in the current application, a first account type of the target account is different from a default second account type of the current application, the first account type is set by the first user, the second users comprise at least some of users in the current application, and the at least some of users have not yet performed a triggering operation of establishing a preset association relationship with the first user.

In a second aspect, embodiments of the present disclosure provide a post visibility permission setting apparatus, comprising:

an operation receiving module configured to receive a target triggering operation from a first user; and a permission setting module configured to set, in response to the target triggering operation, a target post to have a target visibility permission in a current application;

wherein the target post is a post corresponding to the target triggering operation in a target account, and the target post, when having the target visibility permission, is visible to at least some second users in a posted state; the target account is an account logged in by the first user in the current application, a first account type of the target account is different from a default second account type of the current application, the first account type is set by the first user, the second users comprise at least some of users in the current application, and the at least some of users have not yet performed a triggering operation of establishing a preset association relationship with the first user.

In a third aspect, embodiments of the present disclosure provide an electronic device, comprising one or more processors; and a memory configured to store one or more computer programs; wherein when the one or more computer programs are executed by the one or more processors, the one or more processors implement the post visibility permission setting method according to the embodiments of the present disclosure.

In a fourth aspect, embodiments of the present disclosure provide a computer-readable storage medium having computer programs stored therein, wherein the computer programs, when executed by a processor, implement the post visibility permission setting method according to the embodiments of the present disclosure.

BRIEF DESCRIPTION OF DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale.

DETAILED DESCRIPTION

Figure 1:
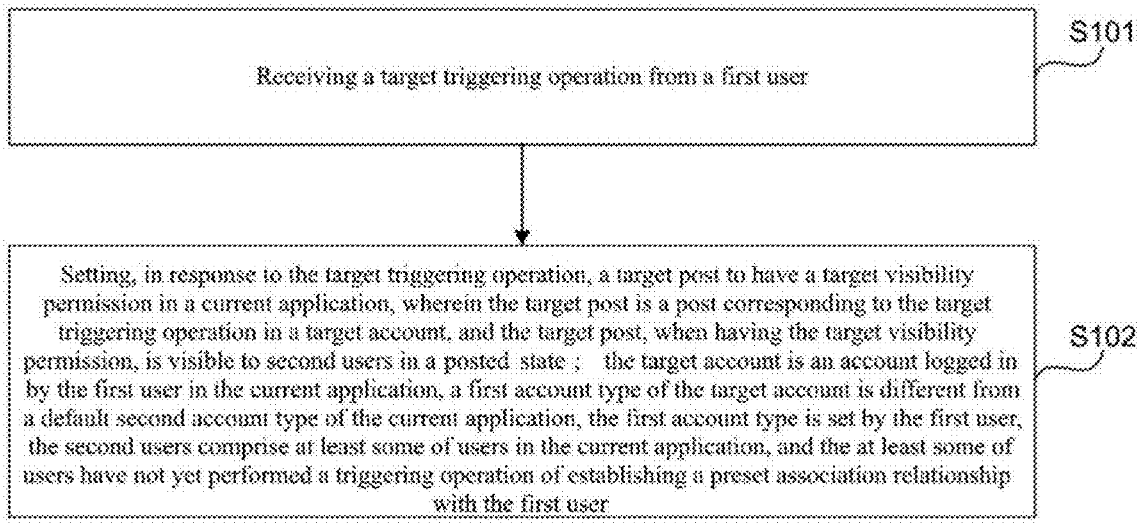
FIG. 1 is a schematic flowchart of a post visibility permission setting method according to an embodiment of the present disclosure.

Embodiments of the present disclosure will be described in more detail below with reference to the accompanying drawings. Although some embodiments of the present disclosure are shown in the drawings, it should be understood that the present disclosure may be implemented in various forms and should not be construed as being limited to the embodiments set forth herein. Rather, these embodiments are provided for a more thorough and complete understanding of the present disclosure. It should be understood that the drawings and the embodiments of the present disclosure are only for exemplary purposes, and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that otherwise explicitly stated in the context, it should be understood as "one or more".

The names of messages or information exchanged between a plurality of apparatuses in the embodiments of the present disclosure are used for illustrative purposes only, and are not indicated to limit the scope of these messages or information.

FIG. 1 is a schematic flowchart of a post visibility permission setting method according to an embodiment of the present disclosure. This method may be performed by a setting apparatus for a post visibility permission, wherein this apparatus may be implemented in software and/or hardware and is configurable in an electronic device, e.g., in a mobile phone or a tablet. The post visibility permission setting method according to the embodiment of the present disclosure is applicable to a scenario where a post visibility permission in a private account is set. As shown in FIG. 1, the post visibility permission setting method according to the embodiment of the present disclosure may comprise:

S101: receiving a target triggering operation from a first user.

In this step, the first user may be understood as a current user, such as the user who currently performs the target triggering operation. The target triggering operation may be a triggering operation for indicating a target post to be set to have a target visibility permission in a current application, such as a triggering operation for indicating creation of the target post with the target visibility permission, a triggering operation for indicating the visibility permission of the target post to be modified to the target visibility permission, or the like.

In this embodiment, the first user may perform the target triggering operation when he/she wants to create the target post with the target visibility permission in the current application or when he/she wants to modify the target post to have the target visibility permission in the current application. Accordingly, the current application may receive the target triggering operation performed by the first user.

S102: setting, in response to the target triggering operation, a target post to have a target visibility permission in a current application.

In this step, the target post is a post corresponding to the target triggering operation in a target account, and the target post, when having the target visibility permission, is visible to second users in a posted state; the target account is an account logged in by the first user in the current application, a first account type of the target account is different from a default second account type of the current application, the first account type is set by the first user, the second users comprise at least some of users in the current application, and the at least some of users have not yet performed a triggering operation of establishing a preset association relationship with the first user.

The target post may be a post corresponding to the target triggering operation, such as a post whose visibility permission is created or modified as indicated by the target triggering operation. This target post may be a post in the target account. Exemplarily, the target post may be a to-be-posted post in the target account, or a posted post in the target account. The to-be-posted post may be considered as a post to be posted in the target post, such as a post which is created by the first user under the indication of the target triggering operation, or a post in the target account that has been completely created but not yet posted. The posted post may be a post in the target account that has been posted, i.e., an already-posted post in the target account of the first user.

The target account may be an account that is currently logged in by the first user in the current application, such as an account that is logged into the current application upon reception of the target triggering operation. The target account may have a first account type. This first account type may be a different account type from a default second account type of the current application. The default second account type of the current application may be considered as a default account type created by the current application, e.g., an account type that is created in response to an account creating operation from a user in the current application. Alternatively, the first account type is a private account type, and the second account type is a public account type. The private account type and the public account type may be two different account types for an account, wherein private account means that posts posted in a private account are only visible to some permitted users by default, while other accounts without permissions will not be able to view these posts even in case of gaining access to the home interface of this private account. Upon completion of their setting, accounts with the private account type and accounts with the public account type may post posts with different visibility permissions by default, e.g., accounts with the private account type may generally only post posts that are visible to followers (i.e., users who follow the accounts), but may not post posts that are visible to non-followers (i.e., users who do not follow the accounts). When posting posts, accounts with the public visibility permission may generally post publicly visible posts by default, i.e., they post posts that are visible to followers and at least some of users other than the followers.

The first account type of the target account may be set by the first user, i.e., the target account is configured to have the first account type by the first user. With reference to an example in which the first account type is the private account type and the second account type is the public account type, when a user (such as the first user) creates an account (such as the target account) in the current application, the current application may create, by default, an account the type of which is the public account type, such as create a public account by default, in case that the user does not perform any setting operation of modifying the account type. During or after creation of the account, the user may set the account type of the created account at any time through corresponding setting operations. Exemplarily, the user may modify the type of the created account from the public account type to the private account type, such as modify the created account from the public account to the private account.

The target visibility permission may be understood as a post visibility permission visible to the second users. A post with the target visibility permission is visible to the second users in a posted state. This posted state may be a state indicating completion of post posting. The second users may comprise at least some of users in the current application who have not yet performed a triggering operation of establishing a preset association relationship with the first user, and may also comprise or not comprise at least some of users in the current application who have performed the triggering operation of establishing the preset association relationship with the first user. This preset association relationship may be an association relationship that is set in advance in the current application, such as a following relationship, a friend relationship, etc. In this case, the triggering operation of establishing the preset association relationship with the first user may be a triggering operation of following the first user, a triggering operation of labeling the first user as a friend, etc. The at least some of users may be users in the current application who have not yet followed the first user, or users in the current application who have not yet labelled the first user as their friend. With reference to an example in which the preset association relationship is the following relationship, a post with the target visibility permission may be only visible to at least some of users who do not follow the poster of this post, and invisible to users who follow the poster of this post; this post with the target visibility permission may also be visible to at least some of users who do not follow the poster of this post as well as at least some of users who follows the poster of this post.

Exemplarily, when the target triggering operation of the first user is received in the target account with the first account type, a target post in the target account, which is corresponding to this target triggering operation, may be set to have the target visibility permission in the current application, i.e., this target post is set to be visible to at least some of users in the current application who have not yet performed the triggering operation of establishing the preset association relationship with the first user. For example, if the target post is the to-be-posted post of the first user, then upon completion of subsequent posting of this target post, the posted target post may have the target visibility permission in the current application; and if the target post is the posted post of the first user, the target post may be modified to have the target visibility permission.

It can be understood that after the target post is set by the first user to have the target visibility permission, the current application may, at the time of subsequent post posting, set by default its subsequently-posted posts to have a preset post visibility permission corresponding to the first account type (such as visible only to followers), and may also set by default its subsequently-posted posts to have the same post visibility permission as that during the previous post posting by the first user or during setting of the post visibility permission by the first user, and this is not limited in this embodiment. After the current application sets by default a certain post to have a certain post visibility permission, the first user may set the post visibility permission of this post as needed.

In some implementations, the target post comprises the to-be-posted post, the setting the target post to have the target visibility permission in the current application comprises: capturing a target post in a first interface and setting the target post to have the target visibility permission in the current application; or using selected post materials in a second interface as post materials for the target post, and setting the target post to have the target visibility permission in the current application.

The first interface may be an interface for creating posts with the target visibility permission by capturing, such as a preset capturing interface, and in the first interface, users may create posts with the target visibility permission by capturing. The second interface may be an interface for displaying post materials, such as a local album interface, and users may select the post materials in the second interface to create posts with the target visibility permission.

In the above implementation, the target triggering operation may be a triggering operation for indicating the creation of the target post with the target visibility permission. Accordingly, the first user may create the target post with the target visibility permission by performing the target triggering operation.

Specifically, the first user may create, in the first interface, posts with the target visibility permission by capturing. For example, the first user may perform the target triggering operation when he/she wants to create posts with the target visibility permission by capturing, such as performing a capturing operation in the first interface. Accordingly, upon reception of the target triggering operation from the first user, the current application may create the target post in the first interface by capturing, and set this captured target post to have the target visibility permission in the current application.

The first user may also create posts with the target visibility permission based on the post materials in the second interface. For example, after the first user has finished selecting, from the second interface, the post materials intended for creation of the target post, he/she may perform the target triggering operation, such as clicking a selection completing control in the second interface. Accordingly, upon reception of the target triggering operation from the first user, the current application may use the post materials selected in the second interface by the first user, as the post materials for the target post, and set the target post to have the target visibility permission in the current application.

In this embodiment, a preset creation control for creating posts with the target visibility permission may be provided in the current application, with an aim of simplifying the user's operations required to create posts with the target visibility permission. In this case, alternatively, before the target triggering operation from the first user is received, the following step is further comprised: displaying a preset creation control in a third interface, wherein the preset creation control is used to trigger displaying of a target interface, and the target interface comprises the first interface and/or the second interface.

The preset creation control may be a creation control for creating posts with the target visibility permission, and may be a different control than creation controls for creating posts with different visibility permissions as needed in the current application. When a post is created based on the preset creation control, the created post may have the target visibility permission by default. The third interface may be an interface for displaying the preset creation control, such as a personal interface of the first user in the current application, etc. The target interface may be an interface indicated displaying by the preset creation control, and comprises the first interface and/or the second interface.

Exemplarily, when the third interface is displayed, the preset creation control may be displayed in the third interface, and when it is detected that this preset creation control is triggered by the first user, the current interface may be switched from the third interface to the first interface/the second interface, thus facilitating creation, by the first user in the first interface/the second interface, of the target posts with the target visibility permission.

In this embodiment, the target post may comprise the to-be-posted post and/or the posted post. When the target post is the to-be-posted post, the first user, after setting the target post to have the target visibility permission in the current application, may further post this target post in the current application. In this case, alternatively, the target post comprises the to-be-posted post, and after the target post is set to have the target visibility permission in the current application, the following step is further comprised: posting the target post in the current application in response to a posting operation for the target post from the first user, wherein the posting operation may be a triggering operation for indicating the target post to be posted, such as an operation of triggering a posting control displayed in the posting interface of the target post, etc. When the current application detects that the posting operation for the target post is performed by the first user, this target post may be posted in the current application in response to this posting operation.

In some implementations, the post visibility permission setting method according to this embodiment further comprises: displaying a post list of the first user in response to a displaying operation for the post list of the first user, the post list is used to display post information of the first user, the post information comprises target post information corresponding to a post with the target visibility permission, and the target post information has a preset identifier.

The post list displaying operation may be a triggering operation for indicating the post list of the first user to be displayed, such as a triggering operation for indicating a preset interface or a preset list panel to be displayed, etc. The preset interface may be an interface for displaying the post list of the first user, such as the personal interface of the first user. The preset list panel may be a panel for displaying the post list of the first user. A post list of a certain user (such as the first user) may be understood as a list of posts posted by this user his/herself, and may be used for displaying the post information of this user, e.g., for displaying the post information of the posted posts of this user. The target post information may be considered as the post information of the posts with the target visibility permission. The post information, for example, may comprise information such as the cover, the title, and/or the number of times of playback of the corresponding post.

In the above implementation, upon reception of the post list displaying operation from the first user, the post list of the first user may be displayed in response to this post list displaying operation, and the post information of the posts that are posted by the first user and have the target visibility permission as well as the post information of the posts that are posted by the first user and have no target visibility permission are displayed in this post list in different display modes.

Figure 2:
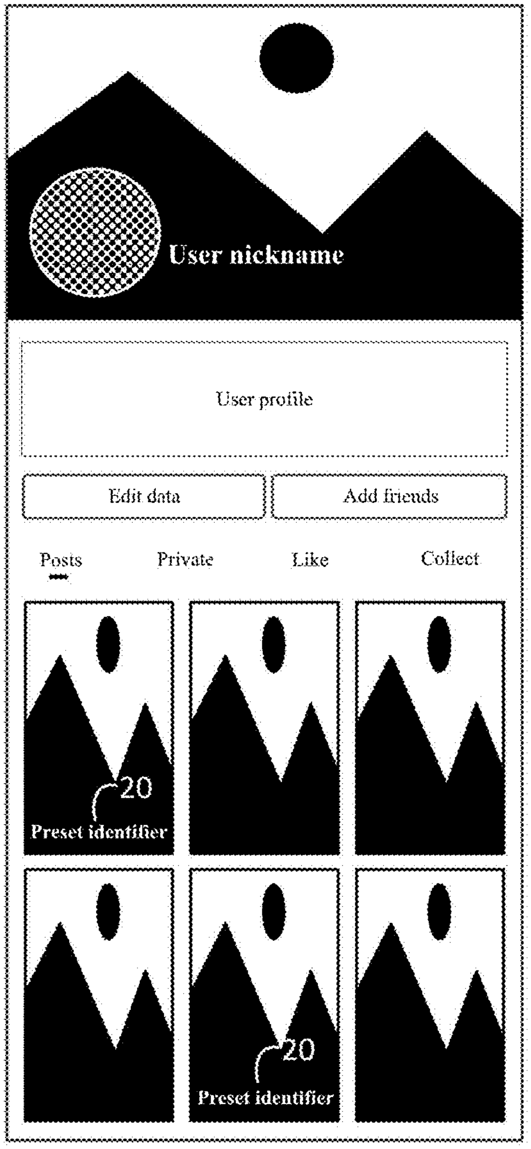
FIG. 2 is a schematic diagram showing a post list according to an embodiment of the present disclosure.

For example, as shown in FIG. 2 (given in the drawing is an example in which the post list of the first user is displayed in the personal interface of the first user), when the post information of the first user is displayed in the post list of the first user, a preset identifier 20 may be displayed in the post information of the post with the target visibility permission in the post list, in order to indicate, through this preset identifier 20, that this post information is the post information of the post with the target visibility permission. In this case, for a post having no target visibility permission in the post list, the post information of this post may display an identifier that is corresponding to the post visibility permission of this post, or may not display an identifier that is used to indicate the post visibility permission of this post, and this is not limited in this embodiment.

It can be understood that when the first user views a post list of another user, the post information of the posts that are posted by the another user and are visible to the first user may be displayed only in this post list. In this case, among the post information displayed, the identifier that is used to indicate the post visibility permission of the corresponding post may not be displayed in the post information of the posts posted by another user and having the target visibility permission as well as in the post information of the posts posted by another user and having no target visibility permission.

The post visibility permission setting method according to this embodiment comprises: receiving a target triggering operation from a first user; and setting, in response to the target triggering operation, a target post to have a target visibility permission in a current application, wherein the target post is a post corresponding to the target triggering operation in a target account, and the target post, when having the target visibility permission, is visible to second users in a posted state; the target account is an account logged in by a first user in the current application, a first account type of the target account is different from a default second account type of the current application, the first account type is set by the first user, the second users comprise at least some of users in the current application, and the at least some of users have not yet performed a triggering operation of establishing a preset association relationship with the first user. With the above technical solution being employed in this embodiment, a user can post, in the account having the first account type, posts that are visible to at least some other users who have not yet performed the triggering operation of establishing the preset association relationship with this user, or set the posts in the account having the first account type to be visible to at least some other users who have not yet performed the triggering operation of establishing the preset association relationship with this user. This technical solution is able to enrich the post visibility ranges that can be set for the posts in the account having the first account type and therefore meet users' needs of setting different post visibilities, as compared to technical solutions in which posts that are visible to followers can only be posted in the account having the first account type.

Figure 3:
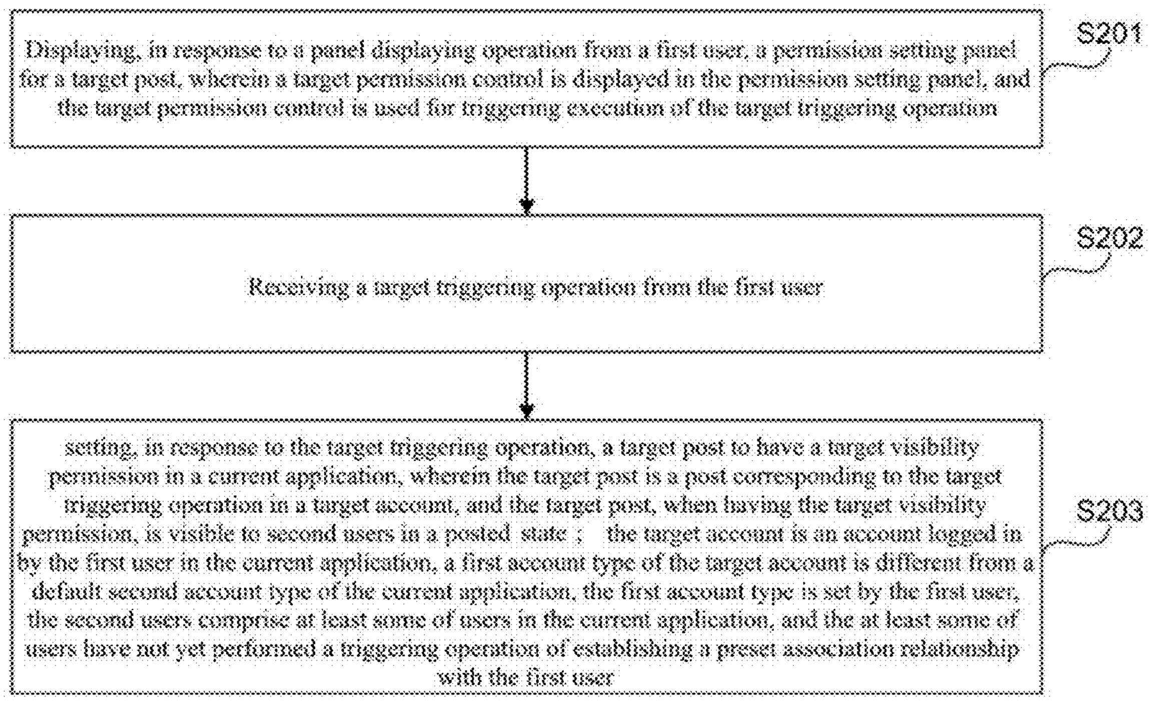
FIG. 3 is a schematic flowchart of another post visibility permission setting method according to an embodiment of the present disclosure.

FIG. 3 is a schematic flowchart of another post visibility permission setting method according to the embodiment of the present disclosure. The solution in this embodiment may be combined with one or more alternative solutions in the above embodiments. Alternatively, before the target triggering operation from the first user is received, the following step is further comprised: displaying, in response to a panel displaying operation from the first user, a permission setting panel for the target post, wherein a target permission control is displayed in the permission setting panel, and the target permission control is used for triggering the execution of the target triggering operation.

Accordingly, as shown in FIG. 3, the post visibility permission setting method according to this embodiment may comprise:

S201: displaying, in response to a panel displaying operation from a first user, a permission setting panel for a target post, wherein a target permission control is displayed in the permission setting panel, and the target permission control is used for triggering execution of the target triggering operation.

In this step, the panel displaying operation may be a triggering operation for indicating the permission setting panel for the target post to be displayed, such as an operation of triggering a permission setting control in a corresponding interface, or a preset gesture operation performed in a corresponding interface, etc. The permission setting panel for a certain post (such as the target post) may be a panel for setting the post visibility permission of this post by the poster, at least one permission control may be displayed in this panel and comprises the target permission control, and various permission controls may be used to trigger setting of a target post to have a post visibility permission corresponding thereto. The target permission control may be a permission control corresponding to the target visibility permission.

Figure 4:
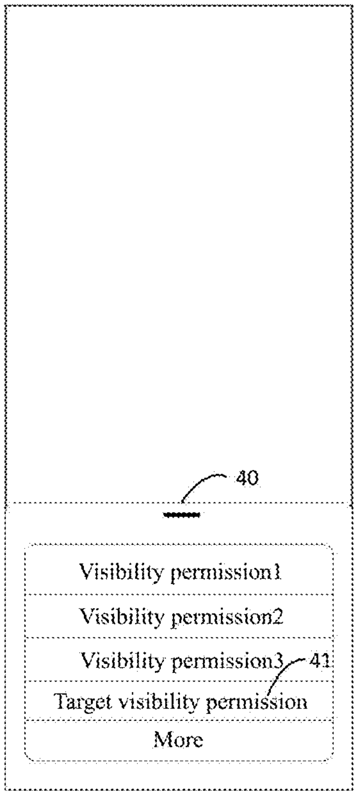
FIG. 4 is a schematic diagram showing a permission setting panel according to an embodiment of the present disclosure.

Specifically, as shown in FIG. 4, when the panel displaying operation from the first user is received, a permission setting panel 40 for the target post may be displayed in response to this panel displaying operation, and at least one permission control including a target permission control 41 is displayed in the permission setting panel 40.

In this embodiment, the location where the permission setting panel for the target post is displayed may be flexibly set as required. Alternatively, the target post comprises a to-be-posted post, and the panel displaying operation acts on a posting interface of the target post; and/or, the target post comprises a posted post, and the panel displaying operation acts on a displaying interface of the target post.

Exemplarily, the target post may be the to-be-posted post or the posted post. When the target post is the to-be-posted post, the first user may perform the panel displaying operation in the posting interface of the target post, and in this case, the current application may display the permission setting panel for the target post in the posting interface of the target post, based on the panel displaying operation from the first user; when the target post is the posted post, the first user may perform the panel displaying operation in the displaying interface of the target post, and in this case, the current application may display the permission setting panel for the target post in the displaying interface of the target post, based on the panel displaying operation from the first user.

S202: receiving a target triggering operation from the first user.

S203: setting, in response to the target triggering operation, a target post to have a target visibility permission in a current application.

In this step, the target post is a post corresponding to the target triggering operation in a target account, and the target post, when having the target visibility permission, is visible to second users in a posted state; the target account is an account logged in by the first user in the current application, a first account type of the target account is different from a default second account type of the current application, the first account type is set by the first user, the second users comprise at least some of users in the current application, and the at least some of users have not yet performed a triggering operation of establishing a preset association relationship with the first user.

Exemplarily, when it is detected that the target permission control displayed in the permission setting panel for the target post is triggered by the first user, it can be determined that the target triggering operation is received, and in response to the target triggering operation, the target post is set to have the target visibility permission in the current application.

With the post visibility permission setting method according to this embodiment, a user can post, in the account having the first account type, posts that are visible to at least some other users who have not yet performed the operation of establishing the preset association relationship with this user. By doing so, it is possible to enrich the post visibility permission that can be set in the account having the first account type and accordingly, and further enrich the visibility ranges of the posts in the account having the first account type.

Figure 5:
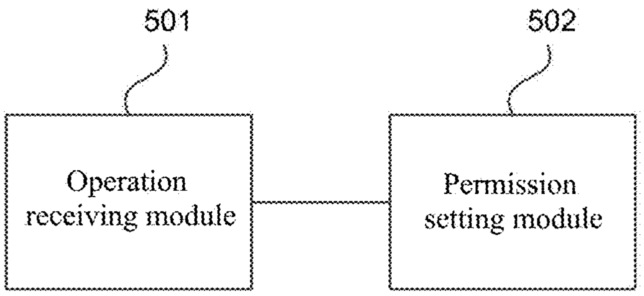
FIG. 5 is a structural block diagram of a setting apparatus for a post visibility permission according to an embodiment of the present disclosure.

FIG. 5 is a structural block diagram of a post visibility permission setting apparatus according to the embodiment of the present disclosure. This apparatus may be implemented in software and/or hardware and is configurable in an electronic device, e.g., in a mobile phone or a tablet. The visibility permission of posts in a private account may be set by performing the post visibility permission setting method. As shown in FIG. 5, the post visibility permission setting apparatus according to this embodiment may comprise: an operation receiving module 501 and a permission setting module 502, wherein

- the operation receiving module 501 is configured to receive a target triggering operation from a first user; and
- the permission setting module 502 is configured to set, in response to the target triggering operation, a target post to have a target visibility permission in a current application;
- wherein the target post is a post corresponding to the target triggering operation in a target account, and the target post, when having the target visibility permission, is visible to at least some second users in a posted state; the target account is an account logged in by the first user in the current application, a first account type of the target account is different from a default second account type of the current application, the first account type is set by the first user, the second users comprise at least some of users in the current application, and the at least some of users have not yet performed a triggering operation of establishing a preset association relationship with the first user.

The post visibility permission setting apparatus according to this embodiment receives a target triggering operation from a first user through the operation receiving module, and sets, in response to the target triggering operation, a target post to have a target visibility permission in a current application through the permission setting module, wherein the target post is a post corresponding to the target triggering operation in a target account, and the target post, when having the target visibility permission, is visible to second users in a posted state; the target account is an account logged in by the first user in the current application, a first account type of the target account is different from a default second account type of the current application, the first account type is set by the first user, the second users comprise at least some of users in the current application, and the at least some of users have not yet performed a triggering operation of establishing a preset association relationship with the first user. With the above technical solution being employed in this embodiment, a user can post, in the account having the first account type, posts that are visible to at least some other users who have not yet performed the triggering operation of establishing the preset association relationship with this user, or set the posts in the account having the first account type to be visible to at least some other users who have not yet performed the triggering operation of establishing the preset association relationship with this user. This technical solution is able to enrich the post visibility ranges that can be set for the posts in the account having the first account type and therefore meet users' needs of setting different post visibilities, as compared to technical solutions in which posts that are visible to followers can only be posted in the account having the first account type.

Further, the post visibility permission setting apparatus according to this embodiment may further comprise: a panel displaying module, which is configured to display, before the target triggering operation from the first user is received, a permission setting panel for the target post in response to a panel displaying operation from the first user, wherein a target permission control is displayed in the permission setting panel, and the target permission control is configured to trigger execution of the target triggering operation.

In the above solution, the target post may comprise a to-be-posted post, and the panel displaying operation may act on a posting interface of the target post; and/or, the target post may comprise a posted post, and the panel displaying operation may act on a displaying interface of the target post.

In the above solution, the target post may comprise the to-be-posted post, and the post visibility permission setting apparatus according to this embodiment may further comprise: a post posting module, which is configured to post, after the target post is set to have the target visibility permission in the current application, the target post in the current application in response to a posting operation for the target post from the first user.

In the above solution, the target post may comprise the to-be-posted post, and the permission setting module 502 may be configured to: create a target post by capturing in a first interface and set the target post to have the target visibility permission in the current application; or use selected post materials in a second interface as post materials for the target post, and set the target post to have the target visibility permission in the current application.

Further, the post visibility permission setting apparatus according to this embodiment may further comprise: a control displaying module, which is configured to display, before the target triggering operation from the first user is received, a preset creation control in a third interface, wherein the preset creation control is configured to trigger displaying of a target interface, and the target interface comprises the first interface and/or the second interface.

Further, the post visibility permission setting apparatus according to this embodiment may further comprise: a list displaying module, which is configured to display a post list of the first user in response to a post list displaying operation from the first user, the post list is used to display post information of the first user, the post information comprises target post information corresponding to a post with the target visibility permission, and the target post information has a preset identifier.

In the above solution, the first account type may be a private account type, and the second account type may be a public account type.

The post visibility permission setting apparatus according to the embodiment of the present disclosure may perform the post visibility permission setting method according to any embodiment of the present disclosure, and has functional modules and advantageous effects that correspond to execution of the post visibility permission setting method. For technical details not described in detail in this embodiment, reference may be made to the post visibility permission setting method according to any embodiment of the present disclosure.

Figure 6:
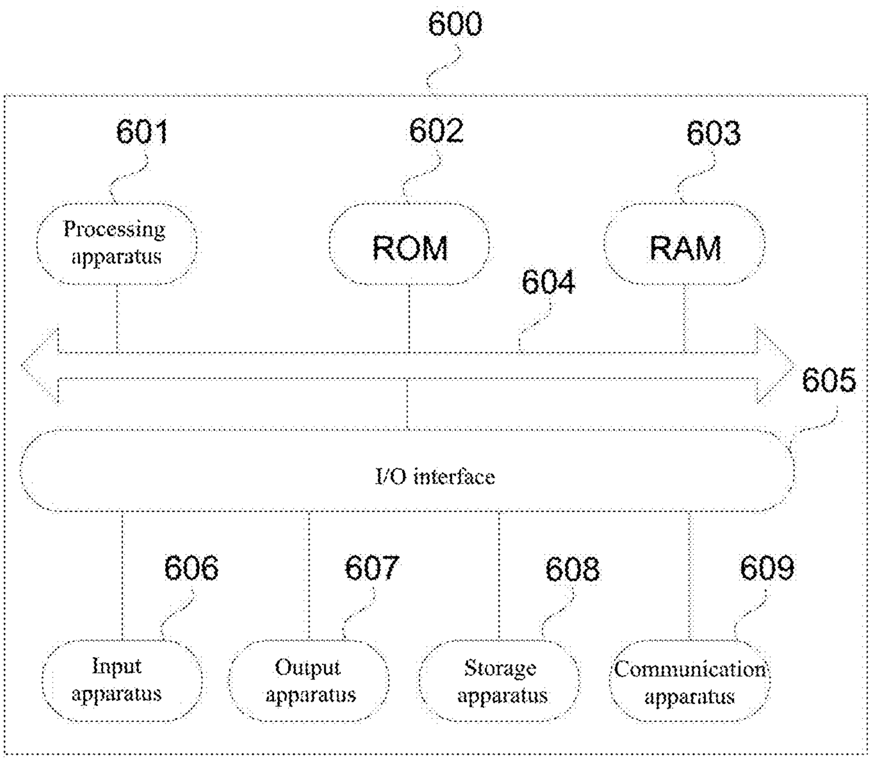
FIG. 6 is a structural schematic diagram of an electronic device according to an embodiment of the present disclosure.

Referring to FIG. 6, FIG. 6 illustrates a schematic structural diagram of an electronic device (e.g., terminal device) 600 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a tablet computer (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 6 is merely an example, and should not pose any limitation to the functions and the range of use of the embodiments of the present disclosure.

As illustrated in FIG. 6, the electronic device 600 may include a processing apparatus 601 (e.g., a central processing unit, a graphics processing unit, etc.), which can perform various suitable actions and processing according to a program stored in a read-only memory (ROM) 602 or a program loaded from a storage apparatus 608 into a random-access memory (RAM) 603. The RAM 603 further stores various programs and data required for operations of the electronic device 600. The processing apparatus 601, the ROM 602, and the RAM 603 are interconnected by means of a bus 604. An input/output (I/O) interface 605 is also connected to the bus 604.

Usually, the following apparatus may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a storage apparatus 608 including, for example, a magnetic tape, a hard disk, or the like; and a communication apparatus 609. The communication apparatus 609 may allow the electronic device 600 to be in wireless or wired communication with other devices to exchange data. While FIG. 6 illustrates the electronic device 600 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 609 and installed, or may be installed from the storage apparatus 608, or may be installed from the ROM 602. When the computer program is executed by the processing apparatus 601, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: receive a target triggering operation; and set, in response to the target triggering operation, a target post to have a target visibility permission in a current application; wherein the target post is a post corresponding to the target triggering operation in a target account, and the target post, when having the target visibility permission, is visible to second users in a posted state; the target account is an account logged in by a first user in the current application, a first account type of the target account is different from a default second account type of the current application, the first account type is set by the first user, the second users comprise at least some of users in the current application, and the at least some of users have not yet performed a triggering operation of establishing a preset association relationship with the first user.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, Example 1 provides a post visibility permission setting method, comprising:

receiving a target triggering operation from a first user; and setting, in response to the target triggering operation, a target post to have a target visibility permission in a current application;

wherein the target post is a post corresponding to the target triggering operation in a target account, and the target post, when having the target visibility permission, is visible to second users in a posted state; the target account is an account logged in by the first user in the current application, a first account type of the target account is different from a default second account type of the current application, the first account type is set by the first user, the second users comprise at least some of users in the current application, and the at least some of users have not yet performed a triggering operation of establishing a preset association relationship with the first user.

According to one or more embodiments of the present disclosure, Example 2 is a method according to Example 1, and before receiving the target triggering operation, further comprises:

displaying, in response to a panel displaying operation, a permission setting panel for the target post, wherein a target permission control is displayed in the permission setting panel, and the target permission control is configured to trigger execution of the target triggering operation.

According to one or more embodiments of the present disclosure, Example 3 is a method according to Example 2, wherein the target post comprises a to-be-posted post, and the panel displaying operation acts on a posting interface of the target post; and/or, the target post comprises a posted post, and the panel displaying operation acts on a displaying interface of the target post.

According to one or more embodiments of the present disclosure, Example 4 is a method according to Example 1, wherein the target post comprises a to-be-posted post, and the method, after setting the target post to have the target visibility permission in the current application, further comprises:

posting the target post in the current application in response to a posting operation for the target post.

According to one or more embodiments of the present disclosure, Example 5 is a method according to Example 1, wherein the target post comprises a to-be-posted post, and the setting the target post to have the target visibility permission in the current application comprises:

creating the target post by capturing in a first interface and setting the target post to have the target visibility permission in the current application; or using selected post materials in a second interface as post materials for the target post, and setting the target post to have the target visibility permission in the current application.

According to one or more embodiments of the present disclosure, Example 6 is a method according to Example 5, wherein the method, before receiving the target triggering operation, further comprises:

displaying a preset creation control in a third interface, wherein the preset creation control is configured to trigger displaying of a target interface, and the target interface comprises the first interface and/or the second interface.

According to one or more embodiments of the present disclosure, Example 7 is a method according to any of Examples 1-6, further comprising:

displaying a post list of the first user in response to a post list displaying operation, the post list being used to display post information of the first user, the post information comprising target post information corresponding to a post with the target visibility permission, and the target post information having a preset identifier.

According to one or more embodiments of the present disclosure, Example 8 is a method according to any of Examples 1-6, wherein the first account type is a private account type, and the second account type is a public account type.

According to one or more embodiments of the present disclosure, Example 9 provides a post visibility permission setting apparatus, comprising:

an operation receiving module configured to receive a target triggering operation from a first user; and a permission setting module configured to set, in response to the target triggering operation, a target post to have a target visibility permission in a current application;

wherein the target post is a post corresponding to the target triggering operation in a target account, and the target post, when having the target visibility permission, is visible to at least some second users in a posted state; the target account is an account logged in by the first user in the current application, a first account type of the target account is different from a default second account type of the current application, the first account type is set by the first user, the second users comprise at least some of users in the current application, and the at least some of users have not yet performed a triggering operation of establishing a preset association relationship with the first user.

According to one or more embodiments of the present disclosure, Example 10 provides an electronic device, comprising one or more processors; and a memory configured to store one or more computer programs; wherein when the one or more computer programs are executed by the one or more processors, the one or more processors implement the post visibility permission setting method according to any of Examples 1 to 8.

According to one or more embodiments of the present disclosure, Example 11 provides a computer-readable storage medium having computer programs stored therein, wherein the computer programs, when executed by a processor, implement the post visibility permission setting method according to any of Examples 1 to 8.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. A post visibility permission setting method, comprising:

receiving a first triggering operation; and setting, in response to the first triggering operation, a first visibility permission in a current application for a first post;

wherein the first post is a post corresponding to the target-first triggering operation in a first account, and the target-first post, when having the target-first visibility permission, is visible to second users in a posted state; the first account is an account logged in by a first user in the current application, a first account type of the first account is different from a default second account type of the current application, the first account type is set by the first user, the first account type is a private account type which means that posts posted in a private account are only visible to users who have established a preset association relationship with the first user by default, the second users comprise at least some of users in the current application, and the at least some of users have not yet performed a triggering operation of establishing the preset association relationship with the first user.

2. The method according to claim 1, wherein the method, before receiving the first triggering operation, further comprises:

displaying, in response to a panel displaying operation, a permission setting panel for the first post, wherein a first permission control is displayed in the permission setting panel, and the first permission control is configured to trigger execution of the first triggering operation.

3. The method according to claim 2, wherein the first post comprises a to-be-posted post, and the panel displaying operation acts on a posting interface of the first post; and/or, the first post comprises a posted post, and the panel displaying operation acts on a displaying interface of the first post.

4. The method according to claim 1, wherein the first post comprises a to-be-posted post, and the method, after setting the first visibility permission in the current application for the first post, further comprises:

posting the first post in the current application in response to a posting operation for the first post.

5. The method according to claim 1, wherein the first post comprises a to-be-posted post, and setting the first visibility permission in the current application for the first post comprises:

creating the first post by capturing in a first interface and setting the first visibility permission in the current application for the first post; or using selected post materials in a second interface as post materials for the first post, and setting the first visibility permission in the current application for the first post.

6. The method according to claim 5, wherein the method, before receiving the first triggering operation, further comprises:

displaying a preset creation control in a third interface, wherein the preset creation control is configured to trigger displaying of an interface, and the interface comprises the first interface and/or the second interface.

7. The method according to claim 1, further comprising:

displaying a post list of the first user in response to a post list displaying operation, the post list being used to display post information of the first user, the post information comprising first post information corresponding to a post with the first visibility permission, and the first post information having a preset identifier.

8. The method according to claim 1, wherein the second account type is a public account type.

9. An electronic device, comprising at least one processor; and a memory communicatively connected with the at least one processor; wherein a computer program executable by the at least one processor is stored in the memory, and the computer program is executed by the at least one processor to cause the at least one processor to perform a post visibility permission setting method, wherein the method comprises:

receiving a first triggering operation; and setting, in response to the first triggering operation, a first visibility permission in a current application for a first post;

wherein the first post is a post corresponding to the first triggering operation in a first account, and the first post, when having the first visibility permission, is visible to second users in a posted state; the first account is an account logged in by a first user in the current application, a first account type of the first account is different from a default second account type of the current application, the first account type is set by the first user, the first account type is a private account type which means that posts posted in a private account are only visible to users who have established a preset association relationship with the first user by default, the second users comprise at least some of users in the current application, and the at least some of users have not yet performed a triggering operation of establishing the preset association relationship with the first user.

10. The electronic device according to claim 9, wherein the method, before receiving the first triggering operation, further comprises:

displaying, in response to a panel displaying operation, a permission setting panel for the first post, wherein a first permission control is displayed in the permission setting panel, and the first permission control is configured to trigger execution of the first triggering operation.

11. The electronic device according to claim 10, wherein the first post comprises a to-be-posted post, and the panel displaying operation acts on a posting interface of the first post; and/or, the first post comprises a posted post, and the panel displaying operation acts on a displaying interface of the first post.

12. The electronic device according to claim 9, wherein the first post comprises a to-be-posted post, and the method, after setting the first visibility permission in the current application for the first post, further comprises:

posting the first post in the current application in response to a posting operation for the first post.

13. The electronic device according to claim 9, wherein the first post comprises a to-be-posted post, and setting the first visibility permission in the current application for the first post comprises:

creating the first post by capturing in a first interface and setting the first visibility permission in the current application for the first post; or using selected post materials in a second interface as post materials for the first post, and setting the first visibility permission in the current application for the first post.

14. The electronic device according to claim 13, wherein the method, before receiving the first triggering operation, further comprises:

displaying a preset creation control in a third interface, wherein the preset creation control is configured to trigger displaying of an interface, and the interface comprises the first interface and/or the second interface.

15. The electronic device according to claim 9, wherein the method further comprises:

displaying a post list of the first user in response to a post list displaying operation, the post list being used to display post information of the first user, the post information comprising first post information corresponding to a post with the first visibility permission, and the first post information having a preset identifier.

16. The electronic device according to claim 9, wherein the second account type is a public account type.

17. A non-transitory computer-readable storage medium having computer instructions stored therein, wherein the computer instructions, when executed by a processor, implement a post visibility permission setting method, wherein the method comprises:

receiving a first triggering operation; and setting, in response to the first triggering operation, a first visibility permission in a current application for a first post;

wherein the first post is a post corresponding to the first triggering operation in a first account, and the first post, when having the first visibility permission, is visible to second users in a posted state; the first account is an account logged in by a first user in the current application, a first account type of the first account is different from a default second account type of the current application, the first account type is set by the first user, the first account type is a private account type which means that posts posted in a private account are only visible to users who have established a preset association relationship with the first user by default, the second users comprise at least some of users in the current application, and the at least some of users have not yet performed a triggering operation of establishing the preset association relationship with the first user.

18. The storage medium according to claim 17, wherein the method, before receiving the first triggering operation, further comprises:

displaying, in response to a panel displaying operation, a permission setting panel for the first post, wherein a first permission control is displayed in the permission setting panel, and the first permission control is configured to trigger execution of the first triggering operation.

19. The storage medium according to claim 18, wherein the first post comprises a to-be-posted post, and the panel displaying operation acts on a posting interface of the first post; and/or, the first post comprises a posted post, and the panel displaying operation acts on a displaying interface of the first post.

20. The storage medium according to claim 17, wherein the first post comprises a to-be-posted post, and the method, after setting the first visibility permission in the current application for the first post, further comprises:

posting the first post in the current application in response to a posting operation for the first post.

* * * * *